United States Patent
McFarland et al.

(10) Patent No.: US 7,385,929 B1
(45) Date of Patent: Jun. 10, 2008

(54) METHOD AND SYSTEM FOR DETECTING FALSE PACKETS IN WIRELESS COMMUNICATIONS SYSTEMS

(75) Inventors: William J. McFarland, Los Altos, CA (US); John S. Thomson, Santa Clara, CA (US)

(73) Assignee: Atheros Communications, Inc., Santa Clara, CA (US)

( * ) Notice: Subject to any disclaimer, the term of this patent is extended or adjusted under 35 U.S.C. 154(b) by 1263 days.

(21) Appl. No.: 09/963,217

(22) Filed: Sep. 25, 2001

(51) Int. Cl.
*G08C 15/00* (2006.01)
(52) U.S. Cl. .................. 370/243; 370/244; 370/245; 370/246; 370/252; 714/738; 714/799; 714/811; 714/819
(58) Field of Classification Search .......... 370/241, 370/242, 243, 244, 245, 246, 252, 241.1; 714/45, 703, 738, 799, 800, 811, 818, 819
See application file for complete search history.

(56) References Cited

U.S. PATENT DOCUMENTS

| | | | | |
|---|---|---|---|---|
| 4,316,285 A | * | 2/1982 | Bobilin et al. ............... 370/512 |
| 4,835,776 A | * | 5/1989 | Annamalai ................... 714/24 |
| 5,838,698 A | * | 11/1998 | Doubler et al. ............. 714/800 |
| 6,349,371 B1 | * | 2/2002 | Ramanadin et al. ........ 711/151 |
| 6,522,875 B1 | * | 2/2003 | Dowling et al. ......... 455/414.3 |
| 6,662,339 B1 | * | 12/2003 | Laneman et al. ........... 714/799 |
| 6,718,493 B1 | * | 4/2004 | Mitlin et al. ................ 714/704 |
| 6,763,490 B1 | * | 7/2004 | Krech et al. ................ 714/738 |

OTHER PUBLICATIONS

International Search Report dated Apr. 8, 2003 for PCT/US02/30449.

* cited by examiner

*Primary Examiner*—Chi Pham
*Assistant Examiner*—Shick Hom
(74) *Attorney, Agent, or Firm*—Bever, Hoffman & Harms, LLP; Jeanette S. Harms (57) ABSTRACT

Specific bits of an incoming transmission are compared against a predetermined bit pattern. If the selected bits do not match the predetermined bit pattern, then the incoming transmission is rejected as a false packet. The predetermined bit pattern can include legal values for predetermined bits in a plurality of fields. Notably, these legal values are set by a networking standard. A parity check may check may be performed in addition to checking for predetermined bits in other fields. A user interface can be used to determine the predetermined bit pattern.

82 Claims, 8 Drawing Sheets

| R1-R4 | Rate |
|---|---|
| 1101 | 6 Mbit/s |
| 1111 | 9 Mbit/s |
| 0101 | 12 Mbit/s |
| 0111 | 18 Mbit/s |
| 1001 | 24 Mbit/s |
| 1011 | 36 Mbit/s |
| 0001 | 48 Mbit/s |
| 0011 | 54 Mbit/s |

METHOD AND SYSTEM FOR DETECTING FALSE PACKETS IN WIRELESS COMMUNICATIONS SYSTEMS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates generally to the field of radio communications and more specifically to the field of detecting unwanted data in a wireless networking system.

2. Discussion of Background

Wireless data networks must function in environments with high radio noise and interference. In order to achieve maximum range, the receivers must operate at extremely low signal levels. As the signal levels move lower, both the noise and interference signals become large compared to the desired signals (the signal-to-noise ratio or "SNR" decreases).

Most available radio systems communicate data in packet form. A radio receiver detects the start of each packet and receives it. Noise and interference can interfere with the correct reception of the packets. In addition, the interference and statistical fluctuation of the background noise can cause the receiver to incorrectly believe a packet is arriving even when one is not. These "false packets" can interfere with the proper operation of the network.

In particular, false packets can reduce the throughput of networks using CSMA (carrier sense multiple access) schemes, which share the available bandwidth with a listen-before-talk style protocol. In such a network, false packets can have at least two detrimental effects. First, during the time that the wireless station believes a false packet is present, it will interpret the medium as busy and will not initiate the transmission of its own data. This will reduce the data flow from that station and slow the network.

False packets can also affect the reception of valid packets. Most communication systems include a predefined preamble code at the beginning of a packet. During normal operation, the receiver uses the preamble to perform a sequence of tasks including antenna selection, gain setting, frequency offset correction, symbol timing recovery, and channel estimation. These actions must be performed in a specific sequence, and must be completed by the time that the data payload in the packet begins. Once the data portion of the packet begins, these preamble activities stop to avoid interfering with reception of the data.

If a false packet causes a receiver to incorrectly commence preamble analysis, the receiver may be unable to synchronize to a valid packet that arrives later, because its receiver sequence is already engaged. In fact, the receiver may not be able to receive a valid packet until processing the false packet is complete or otherwise terminated.

A further complication is raised by terminating reception solely on the basis of a drop in signal strength. In the radio environment, the receive signal may decrease in magnitude over time due to fading. Drops in signal strength are common even on valid packets. Often, packets with significant drops in signal strength can be successfully received if the packet is not abandoned. Therefore, it would be unacceptable to terminate reception on the basis of a drop in signal strength alone.

Because false packets make the medium appear to be busy, and because they obstruct the reception of valid packets, they can significantly reduce the actual data throughput of typical wireless networks. There is therefore a need in the art for techniques and systems to reduce the amount of time a station spends attempting to receive false packets.

SUMMARY OF THE INVENTION

The present inventor has realized that communications protocols, such as the 802.11a Wireless LAN protocol, have insufficient error checking bits to validate incoming packets prior to processing the incoming packets, resulting in lost processing time that occurs when a false packet is processed. The present invention provides a system and method that validates incoming packets by using bits other than parity or error checking bits to check the validity of incoming packets. The present inventor has also realized that bits having a set value or range of values can be used for error checking.

Although particularly applicable to the 802.11a Wireless LAN Protocol, the invention may also be applied to other communication protocols, whether or not the protocol has sufficient internal error checking capabilities. The invention is also applicable whether the protocol is directed to a wireless, RF, HF, microwave, satellite, bluetooth, optic, laser, wired, network, fiber-optic, or any other type of communication systems.

In one embodiment, the present invention provides a method, comprising the steps of, identifying a portion of data comprising at least one data bit, comparing the identified data bit to a legal value, and rejecting the portion of data and any other data associated with the portion of data if the identified portion of data does not match the legal value, wherein the legal value is determined by other than a standard parity check.

In another embodiment, the present invention is a device that includes means for identifying at least one non-parity bit of the transmission, means for comparing the identified bits to a legal value to determine if the identified bits are part of a valid packet, and means for rejecting the identified bits as a false packet if the comparison of the identified bits and legal value do not match.

In yet another embodiment the present invention also provides a device, comprising, a receiver configured to receive data transmissions, a bit recognition device configured to recognize selected bits, including at least one non-parity bit, from an incoming data transmission, a comparator configured to compare the selected bits to a legal value, and a rejection device configured to reject the incoming data transmission if the selected bits do not match the legal value.

Also provided is a method for loading a predetermined set of legal values into a register, wherein said legal values comprise a pattern of at least one bit that matches at least one specific bit location in valid packets, wherein said register is coupled to a packet screening device that validates incoming packets by comparing the incoming packets to said legal values. And, a method for displaying a user interface identifying bits that may be set to check packet validity, retrieving user inputs from the user interface, and storing the user inputs. The stored and loaded values are then used to compare against incoming packets to determine validity of the incoming packets.

Portions of both the device and method may be conveniently implemented in programming on a general purpose/specialized computer, hardwired logic, or otherwise programmed in electronic circuitry. Various results and controlling functions, user inputs, etc., may be displayed on an output device connected to any of the general purpose, networked computers, or transmitted to a remote device for output or display. In addition, any components of the present invention represented in a computer program, data sequences, and/or control signals may be embodied as an electronic signal broadcast (or transmitted) at any frequency in any medium including, but not limited to, wireless broadcasts, and transmissions over copper wire(s), fiber optic cable(s), and co-ax cable(s), etc.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

For the purposes of this section, the IEEE 802.11a Wireless LAN protocol is used as an example. However, as noted above, other communication systems and protocols have similar properties, and the presently described invention could be applied to those systems as well.

Figure 1:
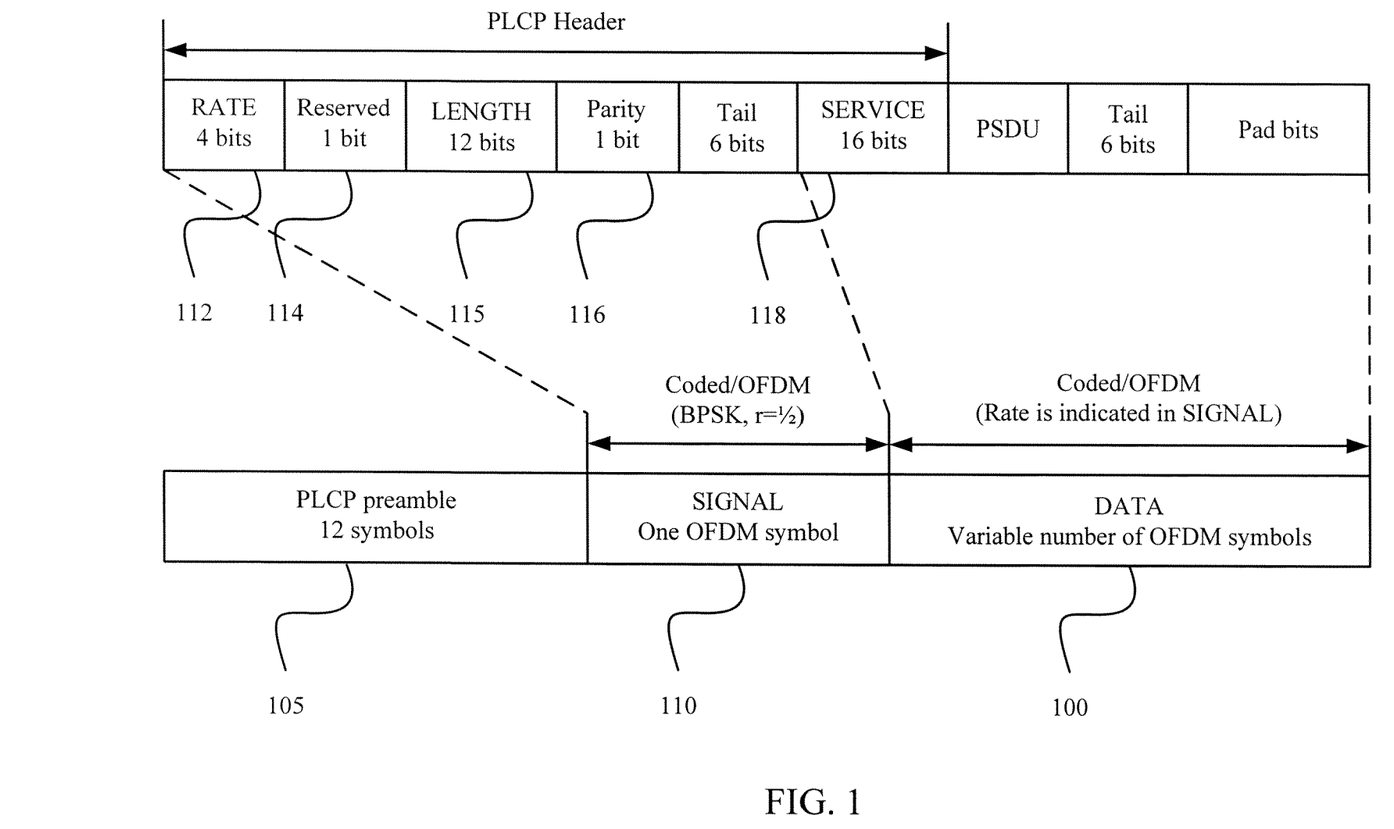
FIG. 1 is a drawing of the format of packets in the 802.11a protocol.

Referring now to the drawings, wherein like reference numerals designate identical or corresponding parts, and more particularly to FIG. 1 thereof, there is illustrated a format 100 of packets in the 802.11a protocol. A PLCP preamble 105, includes 12 symbols that enable antenna selection, gain setting, frequency offset correction, symbol timing recovery, channel estimation and other functions. The PLCP preamble 105 is followed by a SIGNAL symbol 110, which is the first data field that a receiver receiving an 802.11a packet decodes.

As can be seen in FIG. 1, the first data symbol, the SIGNAL symbol 110, contains several bit fields. The rate field 112 (4 bits) specifies the data rate at which the remainder of the data packet is encoded (from 6-54 Mb/s). The length field 115 specifies the number of bits that are in the data portion of the packet. The total length of the data portion of the packet in time can be calculated by taking the length of the packet value of length field 115*8 (the length is indicated in octets) and dividing by the rate. The rate field is decoded based on a table lookup, and then that actual rate is what is used to divide the length.

There is also a parity bit 116 present in the signal symbol. The creators of the protocol intended that this parity bit be the main mechanism for quickly detecting bad packets (false packets). However, false packets from noise or interference are likely to have multiple errors in the signal symbol. If all the bits in the signal symbol are random noise, the single parity bit would still have a 50% chance of being correct. Therefore, the parity bit is a very weak mechanism for weeding out false packets. Generally speaking, it will catch only half of the false packets as errors.

Such weak screening of false packets can cause serious inefficiencies on the wireless network. A false packet can have any value for the rate and length fields. In the worst case, the rate can be the lowest rate, while the length is the longest possible length. In this case the station will consider the medium to be busy for a very long time, and will be unable to transmit or receive for this long period of time.

For the 802.11a standard, given the encoding of the rate and length fields, on average, the false packets will interrupt transmission and detection for a period of time equal to a length of 4096 bytes divided by a rate of ~18 Mb/s, or an average time of 1.8 ms. This is a significant loss considering that in that same time over 12 k bytes of data could have been transferred at the 54 Mb/s data rate. Since such false packets can occur frequently in environments with interference or weak signals (including high noise environments), the throughput can be seriously degraded.

Figure 2:
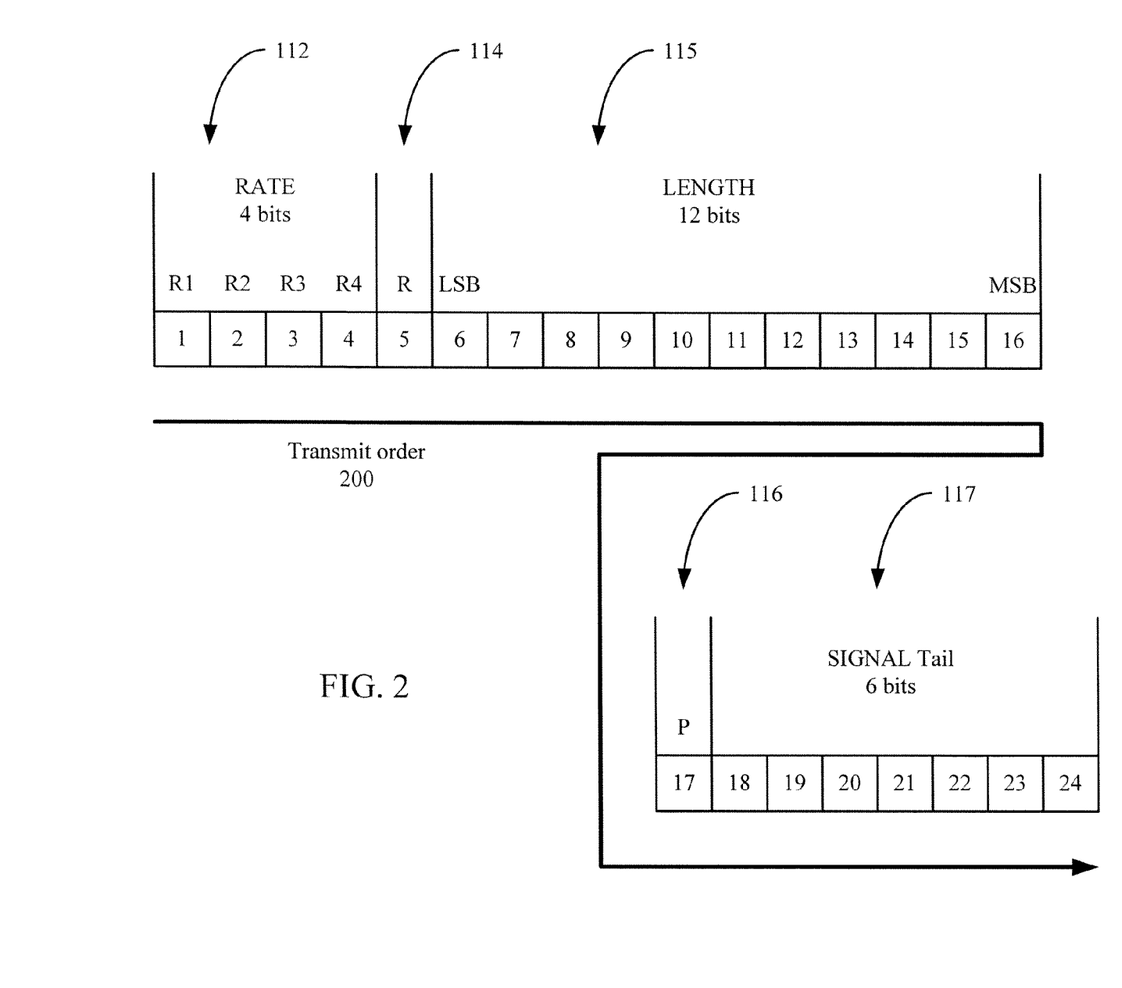
FIG. 2 is a drawing of a more detailed view of the 802.11a signal symbol.

FIG. 2 illustrates a more detailed view of the 802.11a signal symbol. The signal symbol has rate bits 112 stored in bits 0 through 3, reserved bit 114 in bit 4, length bits 115 in bits 5 (LSB) through 16 (MSB), parity bit 116 in bit 17, and a signal tail 117 in bits 18 through 23. Each of the signal tail bits, according to the 802.11a standard, are set to "0." A transmit order 200 indicates the order of transmission for bits transmitted in the 802.11a standard.

Figure 3:
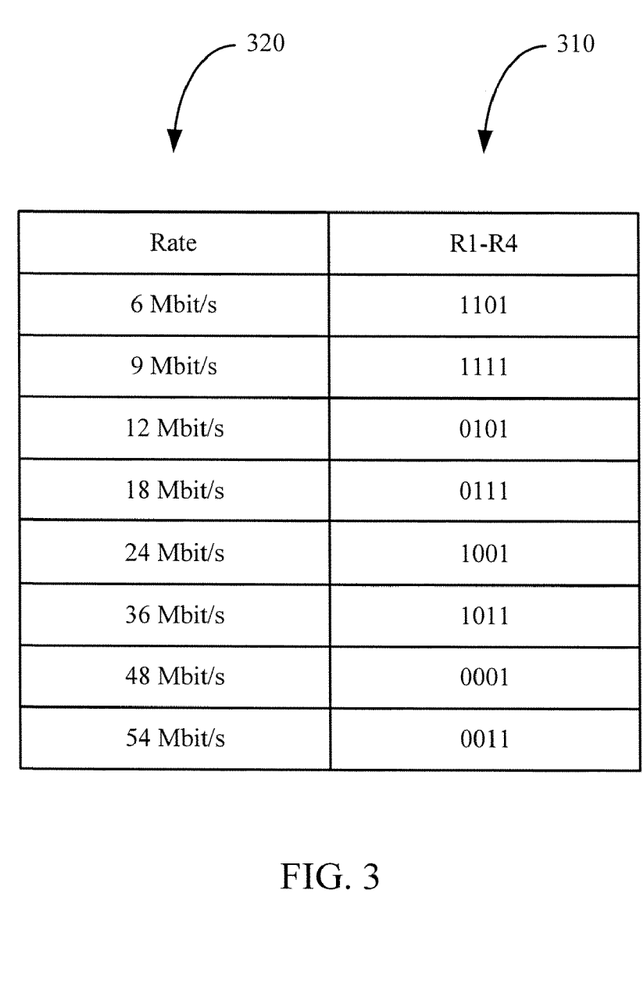
FIG. 3 is a drawing of the encoding of the 802.11a rate field.

FIG. 3 illustrates the encoding of the rate field. The four bits 310 in the rate field could describe up to 16 different data rates. Since, however, only eight different rates are defined by the 802.11a standard (rates 320), not all possible combinations of the four rate field bits are used. As illustrated in FIG. 3, the 802.11a standard manages the unused rate field bit by always setting the fourth rate bit equal to "1". The preferred embodiment of the present invention therefore checks that this is the case, as all valid packets under 802.11a will have R4 set to "1". If a packet with a forth bit (R4) of "0" is ever received, it is assumed to be a packet with an error, or a false packet, in which case, reception is aborted, and the channel is no longer indicated as busy.

According to the 802.11a standard, the reserved bit 114 must be transmitted (set) as a "0". Therefore a "1" in this location indicates a bad or false packet. Because it is a "reserved bit" this bit might be used in a future protocol yet to be determined. This potential change (or changes in other bits, e.g. R4) may be accommodated by the preferred embodiment, as discussed with reference to FIGS. 6-8 herein, by allowing a change to the values stored in a false detect control register, or other register, storage, or calculation device configured to produce the set values that are indicative of a valid packet. These changes may be updated via software with user assistance or by downloading and installing a driver having knowledge of the set values indicative of a valid packet. In this example, if the reserved bit were changed to indicate some value, the check of the reserved bit would no longer be performed and packets with either 1 or 0 in the reserved bit location would be accepted as valid.

The length field is defined by the 802.11a standard to be a 12 bit integer which indicates the number of bytes in the data field. This would support lengths up to 4096 bytes. However, the 802.11a standard defines packets up to only 2346 bytes. Further, in most applications, the packets are Ethernet packets, which have a maximum length of 1518 Bytes. Depending on the application the wireless station is being used in, all lengths greater than either 2346 or 1518 can be considered bad packets or false packets.

Figure 4:
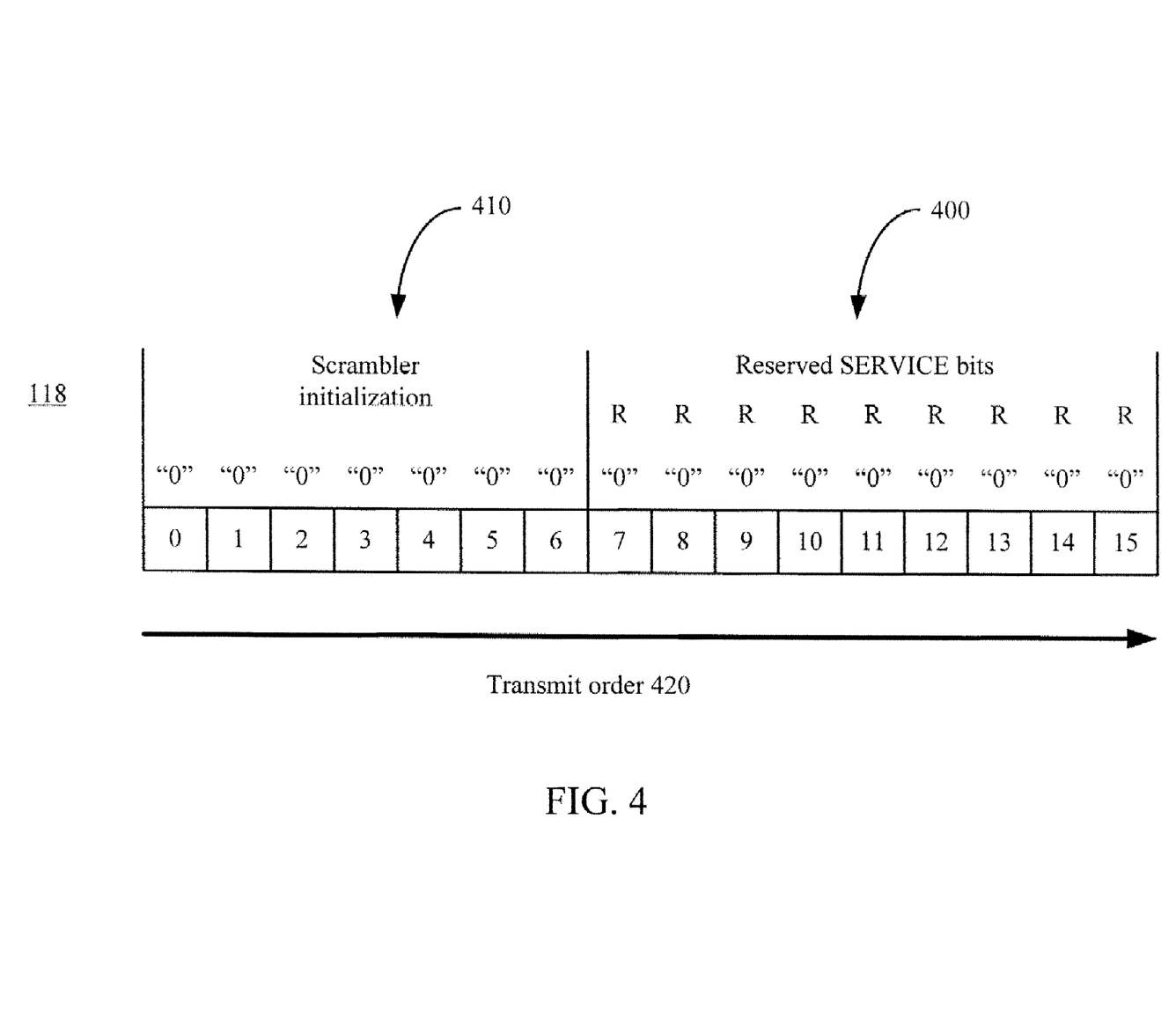
FIG. 4 is a drawing of the encoding of the 802.11a reserved service bits.

FIG. 4 provides another example of bits defined to have a set value according to the 802.11a standard. Reserved service bits 400, bits 7 to 15, are set to 0, and scrambler initialization bits 410, bits 0 to 6, are also set to 0. A transmit order 420 indicates the order that the bits are transmitted when transmitted in an 802.11a packet.

Figure 5:
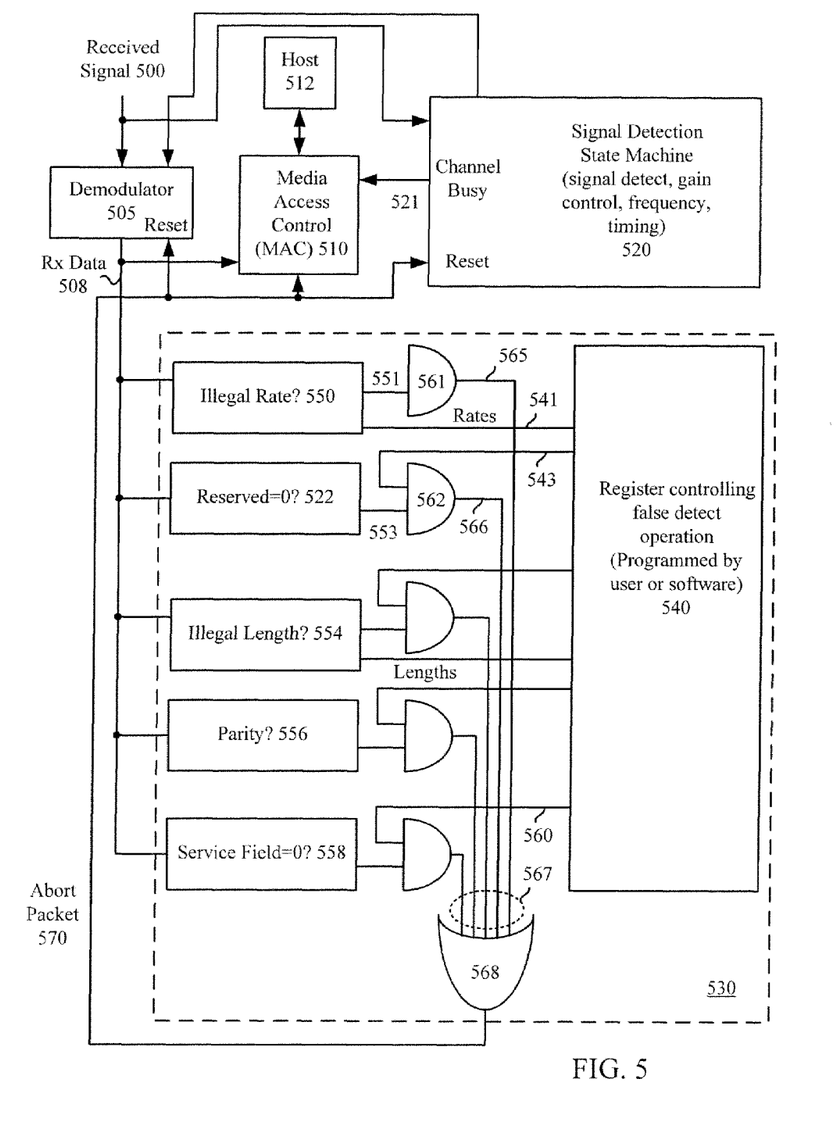
FIG. 5 is a circuit block diagram of a preferred embodiment of the present invention.

FIG. 5 illustrates in block diagram form of a preferred embodiment of the present invention. A received signal 500 (which is described herein in the context of the 802.11a protocol, but may also be any other communication protocol having characteristics similar to those of the 802.11a protocol) is input to a demodulator or other equipment that performs analog processing, frequency conversion, etc., converting the received signal to a manageable frequency (e.g., intermediate frequency), and performing an analog to digital conversion to digitize the incoming signal, producing Rx Data 508.

The Rx Data 508 is transmitted to a Media Access Control (MAC) device that controls access of the RX Data 508 to a host device 512. A signal detection state machine 520 performs signal detection, a process of detecting that a signal is being received by the demodulator. Upon detection of a signal being received by the demodulator, the signal detection state machine 520 asserts a channel busy line 521. The channel busy line 521 signals the MAC 510 that a packet is being received by the demodulator, and the MAC 510 then begins receiving the incoming packet. The channel busy line also tells the MAC that packets cannot be transmitted on a communications channel shared by incoming and outgoing packets. In one embodiment, the channel busy line is also connected to a transmitter (not shown), the channel busy line signaling the transmitter to halt any transmissions. The signal detection state machine 520 also performs gain control, frequency control, and timing (e.g. symbol timing).

The Rx Data 508 is input into a logic block 530. The illustrated logic block preferably examines all the bits in the signal symbol, looking for any combination of bits that is not legal. Legal values include specific bit patterns or ranges of values. The legal values are comparison data used to compare against data or fields of packets being tested for validity. The logic block 530 may be called a comparator as its main task is to compare bits of an incoming data packet with legal values (predetermined values, comparison data) that comprise either individual set values or ranges of values that are valid for a particular set of bits. The timing of the bits to be examined is provided by the signal detection state machine 520 or another timing device.

In operation, the Rx Data 508 is input to the logic block/comparator 530 and specific bits of the Rx Data are captured in memory locations. For example, the rate bits 112, 4 bits, are captured in check device 550. Check device 550 comprises a memory location capable of holding the 4 rate bits 112. Other bits (e.g., reserved bit 114, length bits 115 parity bit 116, and service bits 118 are stored in check devices 552, 554, 556, and 558 respectively. Alternatively, the specific bits of the Rx Data are captured in a single memory location, or read into a firmware or software programmed memory location for storage and comparison processing. Also alternatively, other combinations of bits, fields, or other Rx Data that are to be checked are saved.

The saved Rx Data will be checked against a predetermined bit pattern to determine if the packets are valid. The predetermined bit pattern is either a set bit value(s) from which corresponding bits being checked must be equal to, or the predetermined bits are a set of values (e.g. table of values), any one of which the bits being checked can be equal to. The predetermined bits may also comprise a range of bit values of which the bits being checked must fall within.

A register 540 contains the legal values for each of the bits to be checked. The exact number of checks executed is preferably enabled or disabled by the user, by software or by an update in the software configuration of the device. This control allows the device to be forward compatible, in case the reserve bit or currently illegal patterns become part of the protocol in the future.

The register 540 includes data that indicates whether a particular bit or set of bits are being checked. The register may also include the predetermined pattern against which the bits from the incoming packet are being checked. For example, rate check device 550 is a memory location that stores the rate field of an incoming packet. A valid rate or set of rates is transmitted from the register 540 to the rate check device 550. The rate check device 550 includes logic for comparing the valid rate, set of rates, or rate range against the stored rate field. Alternatively, the rate check device 550 identifies a programmed operation of a high speed data processor that compares the valid rate/rates to the rate field of the incoming packet. An invalid rate in the incoming packet's rate field results in the illegal rate line 551 being asserted.

The register 540 also contains an indication as to whether a particular check is to go forward. In the rate check device example, if the rate field is to be checked, the register 540 asserts rate check line 542. If both the rate check line 541 and illegal rate line 551 are asserted, rate abort line 565 is asserted.

In another example, the predetermined bit pattern for checking the reserved bit is pre-programmed into reserved bit check device 552. As discussed above, the reserved bit value is preprogrammed to 0. If the reserved bit is not 0, reserved bit line 553 is asserted. And, if the reserved bit is to be checked, determined by assertion of the reserved bit check line 543 by register 540, then, the reserved bit abort line 566 is asserted.

The parity bit can be performed as is done in available solutions. It is difficult to use the signal tail field 117 for this purpose. This field is used to complete the trace back in the Viterbi decoder. Therefore these bits are not decoded with accuracy even in a valid packet. However, there is another field in FIG. 1 that can be used—the Service field 118. As shown in FIG. 4, the first 7 bits of the Service field, scrambler initialization 410, are set to 0 to initialize the scrambler in the receiver. However, the remaining 9 bits in the service field, reserved service bits 400, are reserved, and are set to 0 concurrently. Therefore, each of the reserved service bits 400 can be used for screening out false packets. Preferably, the bits checked are selectable since new interoperability standards may make use of these bits.

If any of the above listed errors are detected, and the register is configured for the error to be considered, then the reception of the packet is aborted by notifying the Medium Access Controller (MAC) that the packet is bad and to be abandoned, and resetting the demodulator and the signal detection state machine and circuitry. Thus, if any of abort lines 567 are asserted, logic gate 568 asserts the abort packet line 570. Abort packet line signals the MAC 510 to abort a packet currently being received and signals the demodulator 505 to reset. The Abort packet line also signals the signal detection state machine 520 clear the channel busy signal 521. The reset of the signal detection circuitry and state machine will in turn cause the medium busy signal to be cleared going to the MAC. The station is then ready to transmit, or begin reception again. Alternatively, the channel busy signal may also be configured to notify a transmitter that it is ok to transmit.

As described in the background section, using only the parity bit there is a 50% chance for a false packet to be interpreted as a valid packet, resulting in wasted time and bandwidth across the medium. Each additional bit that is checked reduces the odds of false packets getting through by a factor of two. The present invention, using just the rate and length checks, would reduce the likelihood of false packets making it through the screening by approximately a factor of 8. If screening on the reserved bits is activated as well, the odds are reduced by a further factor of 1024. When all of the disclosed checks in the preferred embodiment are enabled, the odds of false packets making it through the screen are reduced from those of the standard scheme by many orders of magnitude.

Figure 6:
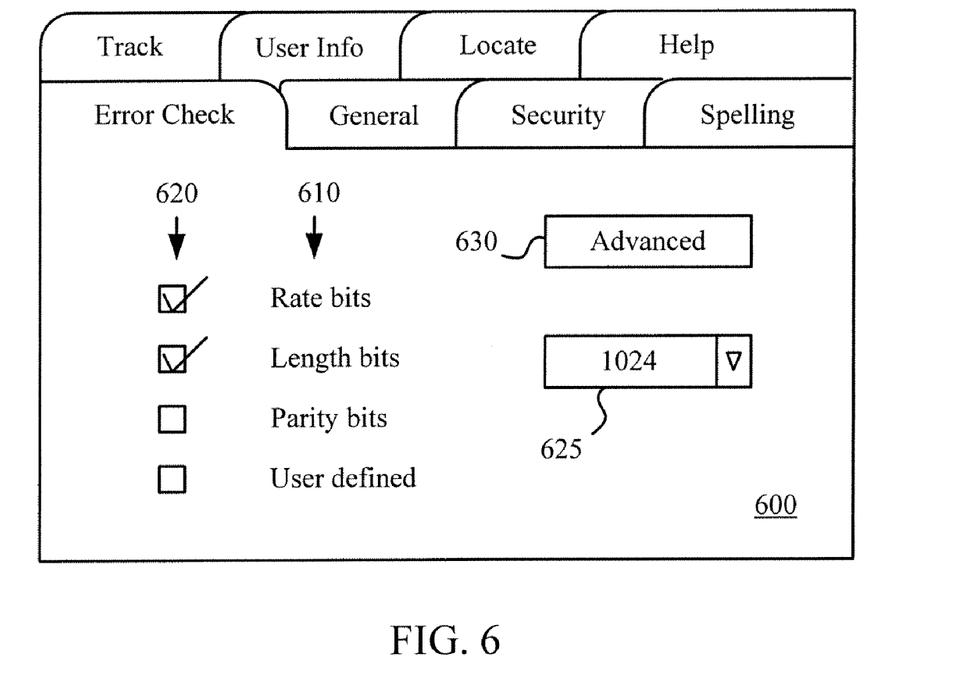
FIG. 6 is a screen shot of an example error check set-up screen according to an embodiment of the present invention.

FIG. 6 is a screen shot of an example error check set-up screen 600 according to an embodiment of the present invention. The error check set-up screen 600 is selected from a tabbed set of options from a network set-up program or other software interface. The error check screen includes a list of bit fields 610 and a set of check boxes 620 corresponding to each listed bit field. A user selects check boxes corresponding to the bit fields that are to be tested for detection of false packets. In some cases, default bit fields are pre-programmed into the error check.

For example, under the 802.11a standard, as discussed above, the R4 bit is always set to "1". Checking the Rate bits check box identifies the R4 bit of the rate field to be checked for packet validity. In another example, the length bits field includes a pull down selection box 625 that allows the user to select a max valid length for a packet. In this example, the selected max value is 1024, thus any packet having a length greater than the selected value is determined to be a false packet.

Many other forms of an error check screens may be implemented and still fall within the scope of the present invention. The main point is to provide the user an ability to select which bits/fields are either set or within predetermined ranges for a valid packet.

Figure 7:
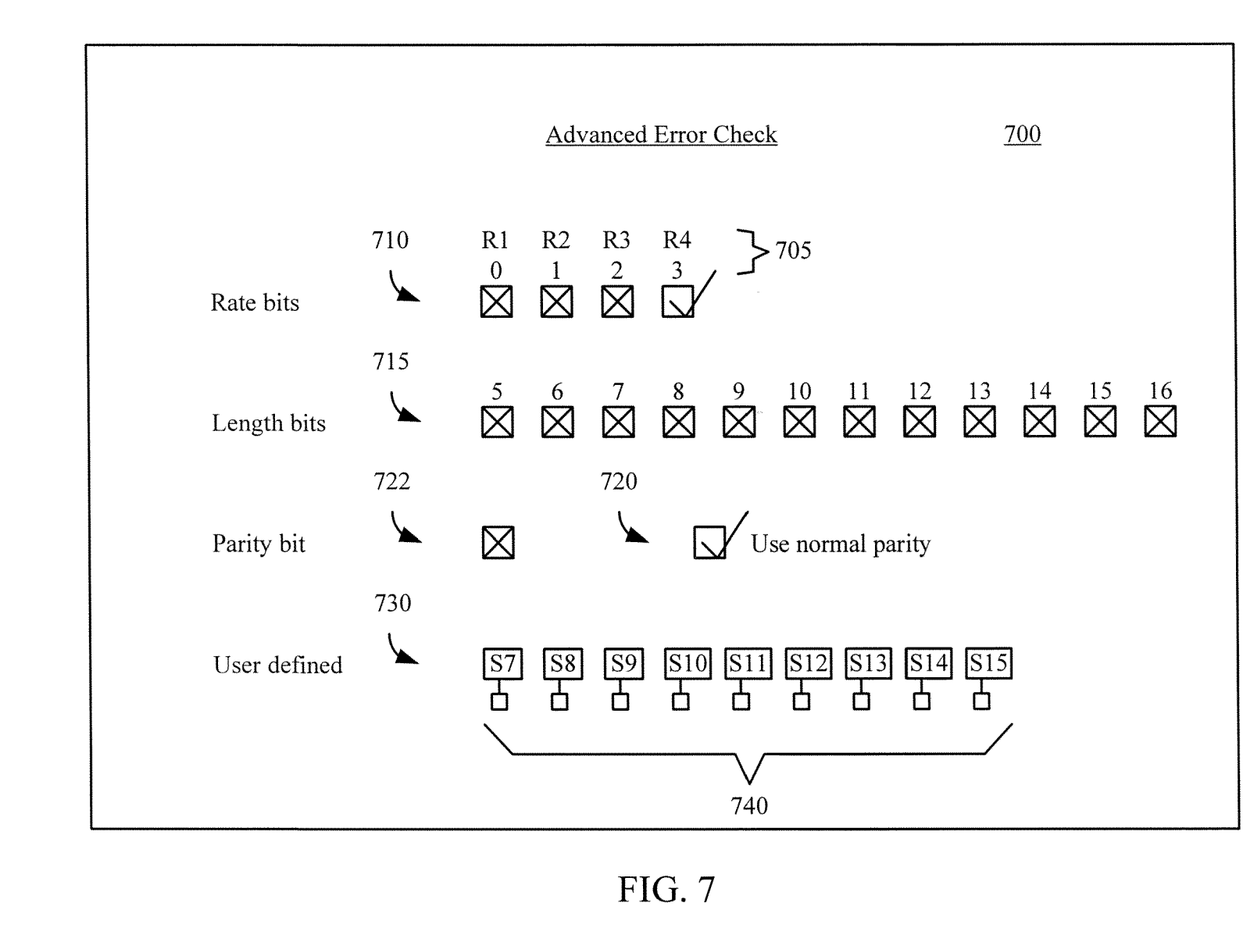
FIG. 7 is an example advanced error check screen 700 according to an embodiment of the present invention.

The example error check screen 600 includes an advanced button 630 that brings up an advanced error check screen. FIG. 7 is an example advanced error check screen 700 according to an embodiment of the present invention. The advanced error check screen 700 provides a user the ability to select values of specific bit values within specified fields of a packet. The selection facilities include, for example using the rate bits. Rate bit identification 705 identifies the available rate bit fields, and rate bit check boxes 710 are used to identify bit values. The rate bit check boxes are set as either "1", identified by a check mark, "0", identified as a blank check box, and don't care, which is identified as an x mark in the check box. For the rate bits, the current example shows bits R1-R3 as don't care, and R4 set to "1". Length bits 715 are also shown and all set to don't care.

Parity bit checks 720 include setting the parity bit to a specific bit value (check box 722), and/or an option to use normal parity checks. When using normal parity checks, additional logic is contained in check device 556 to determine a proper bit pattern according to normal parity procedures. In this manner the normal parity check is implemented in addition to the checks of other set bit values or ranges of values. Alternatively, the parity check box fields may be one, don't care, or zero, if the applicable protocol specifies a set value for any of the parity bit fields (or parity bit). Since the 802.11a standard uses the parity bit, unless a particular implementation or other restriction on the parity bit is imposed, the use normal parity selection is normally selected for 802.11a packets.

A user defined field is also shown having bit selection boxes 730 and check boxes 740. A user selects one or more specific bits in the bit selection boxes 730 and specifies the value in check boxes 740. In this example, the user has selected each of service bits S7 through S15. The check boxes 740 are each deselected indicating a value of "0", consistent with the 802.11a standard discussed with reference to the service bits shown in FIG. 4. Other fields or selected bits may be displayed on the error check and advanced error check screens depending on the implementation and protocol to be checked.

Figure 8:
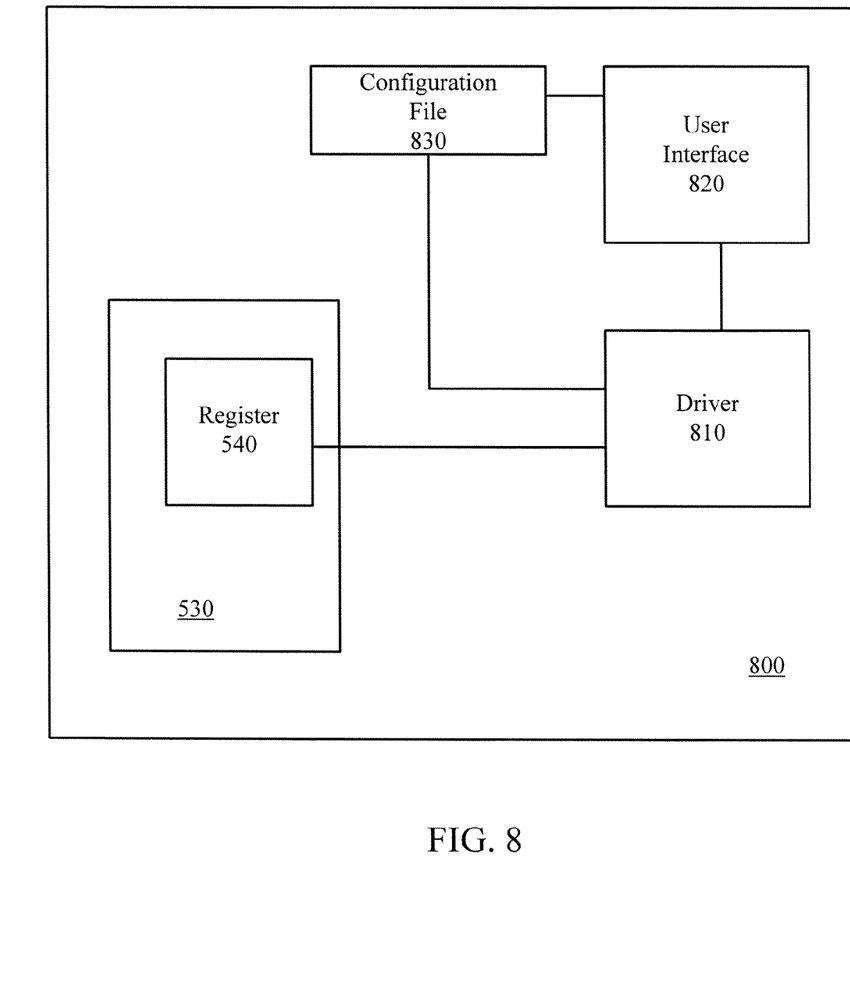
FIG. 8 is a block diagram that illustrates hardware and/or software components that may be configured in several possible embodiments of a device according to the present invention.

FIG. 8 is a block diagram that illustrates hardware and/or software components 800 for several possible embodiments of a device according to the present invention. As discussed previously, logic block/comparator 530 may be constructed of memory element and logic devices that compare identified bits and/or fields of an incoming packet against a predetermined pattern(s). Logic block/comparator 530 may also be a processing device that performs a similar comparison. The result is control logic that identifies false packets.

The identified bits and/or fields of the incoming packets may be selected via a user interface according to FIGS. 6 and 7, or another interface that allows the user to select bits, fields, and identify valid values whether the valid values are a table of possible entries, a range of values, or specific bit patterns. The selected bits and field values are then compiled into one of a software, firmware, programmed logic, or other driver device 810. The driver device 810 loads the register 540 with the valid values. In addition to valid values, the register may also maintain other logic for calculating valid values.

A user interface 820, a program that invokes a similar GUI as shown in FIGS. 6 and 7, may directly supply the driver device 810 with the valid values, or compile the driver device into an independent executable program. In one embodiment, the User Interface is run on a device separate and remote from the logic block/comparator (i.e., a manufacturer's site). The driver is compiled from the user interface input values and then the driver is shipped independently (or downloaded) to an end user's site where the driver is run to load register 540. The driver may be run at a first set-up time of the logic block/comparator 530, or may run each time the logic block/comparator is started.

In another alternative, the User interface 820 writes the valid values to a configuration file 830. The driver reads the configuration file and updates the register 540.

Based on the present disclosure, any number of configurations are possible. For example, two methods for updating or changing the screening checks that are active have already been described. One is for the user to reconfigure the device through a user interface. The other is to load new software from storage media or over a network which automatically updates the screening checks being performed. Another method to change the screening checks being performed is to have intelligence within the device or software for the device that can intelligently choose the best set of screens in a given situation.

In particular, the 802.11a standard provides a frame check sum (FCS) at the very end of the packet that also can be used to indicate if the packet was valid. This check comes too late to be of value for false packet screening. However, it can be used to intelligently choose the screening that is appropriate.

As an example, consider a situation in which in some locations devices are using the service field to convey information, while in other locations, devices are forcing the service field to all zeros. In this case a device that roams between to the two locations could use the following algorithm.

At first the device does not reject packets according to the service field values. However, during this time it checks to see if any packets with a correct FCS arrive that have the service bits set other than zero. If such packets arrive, they are known to be valid because of the correct FCS, and the device would know not to screen packets based on the service field. However, if all packets with correct FCS values have the service field set to all zeros, then the device may safely reject packets based on the values in the service field. This additional screening in the environments that allow it improves network throughput.

A similar approach of starting with a given check turned off, observing the patterns of valid packets (as indicated by both the parity bit in the signal symbol and the Frame Check Sum at the end of the packet), and determining whether the given screen can be turned on can be applied to all of the potential screens discussed previously. This includes the checking of the rate, length, reserved, and service fields.

The advantage to having the software or device intelligently select the packet screening checks is that the user does not need to intervene, and the system can adapt dynamically to the situation without the need to load new software or configuration information.

Although the present invention has been described herein with reference to the 802.11a protocol, the devices and processes of the present invention may be applied to other protocols having set or determinable fields.

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits, logic devices, including programmable logic, or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, storing predetermined field and bit values, retrieving and comparing bit and field values, resetting MACs, demodulators, receivers, and transmitters, producing timing signals, identification and retrieval of bit/field values from a user, device driver, or other source, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for detecting a false packet, the method comprising:
   receiving a transmission;
   accessing bit information regarding a plurality of fields of a valid packet, wherein each field includes at least one predetermined bit, and wherein the bit information includes legal values for the predetermined bits as set by a networking standard, wherein the predetermined bits include at least one of a rate bit, a length bit, a reserved bit, and a service bit;
   identifying bits of the transmission;
   comparing identified bits of the transmission to the legal values for the predetermined bits; and
   rejecting the identified bits as a false packet if a comparison of the identified bits and the legal values do not match.

2. The method according to claim 1, wherein said step of comparing does not include parity bit calculations.

3. The method according to claim 1, wherein said step of rejecting comprises resetting a receiver device that receives the transmissions.

4. The method according to claim 1, wherein said step of rejecting comprises the steps of,
   clearing a line busy signal used by at least one of a receiver and a transmitter.

5. The method according to claim 1, wherein said legal values comprise at least one of specific bit values and ranges of bit values.

6. The method according to claim 1, wherein said step of rejecting comprises rejecting other bits associated with the identified bits as the false packet.

7. The method according to claim 1, wherein the legal values corresponding to length bits specify a range of values.

8. The method according to claim 1, wherein the predetermined bits include a parity bit.

9. The method according to claim 1, wherein the identified bits comprise any bits that have at least one of a fixed value and a range of values.

10. The method according to claim 9, wherein said fixed value and range of values are not determined via a parity calculation.

11. The method according to claim 1, further comprising the step of setting at least one legal value based on a user input.

12. The method according to claim 1, further comprising the step of programming the legal values.

13. The method according to claim 1, further comprising the step of writing the legal values to a register for use by said comparing step.

14. The method according to claim 13, wherein said step of writing comprises running a program configured to write said register.

15. The method according to claim 14, wherein said program is a software program configured to determine the legal values and write them to the register.

16. The method according to claim 14, wherein said program is a firmware based program configured to read the legal values and write them to the register.

17. The method according to claim 14, wherein said program is a programmable logic device configured to determine the legal values and write them to the register.

18. The method according to claim 14, wherein said program is controlling software that implements said method.

19. The method according to claim 14, wherein said program is device software.

20. The method according to claim 1, further comprising the step of calculating at least a portion of the legal values.

21. The method according to claim 1, wherein said transmission is an OFDM transmission.

22. The method according to claim 1, wherein said transmission is a wireless transmission.

23. The method according to claim 1, wherein said transmission is an 802.11a transmission.

24. The method according to claim 1, wherein said legal values match selected bits from an 802.11a packet.

25. The method according to claim 1, wherein said legal values are determined prior to receipt of the transmission.

26. The method according to claim 1, wherein said transmission is a wireless transmission and said legal values match selected bits from a packet protocol.

27. The method according to claim 1, further comprising the step of choosing the legal values.

28. The method according to claim 27, wherein the legal values include bit patterns chosen based on previously received packets.

29. The method according to claim 1, further comprising:
testing values used in a field of received packets to determine a range of legal values being transmitted in the tested field; and
adding the tested field to the plurality of fields and adding the range of legal values to the bit information.

30. The method according to claim 29, wherein said step of testing includes the step of checking to determine if received packets are valid, and, disregarding invalid packets.

31. The method according to claim 29, wherein said step of testing comprises testing values of fields within packets of the transmission to determine if they are being used.

32. The method according to claim 30, wherein said step of checking comprises performing an FCS test on the received packets.

33. The method according to claim 29, wherein the tested field is a service field.

34. The method according to claim 29, wherein the tested field includes at least one of rate bits, length bits, reserved bits, and service bits.

35. The method according to claim 29, wherein the received packets are 802.11a packets.

36. A device for detecting a false packet, the device comprising:
a receiver configured to receive incoming transmissions;
a bit recognition device configured to recognize selected bits from an incoming transmission;
storage for bit information regarding a plurality of fields of a valid packet, wherein each field includes at least one predetermined bit, and wherein the bit information includes legal values for the predetermined bits as set by a networking standard, said predetermined bits comprising at least one of a data rate bit, a length bit, and another predetermined bit, and said storage comprising a register configured to store the legal values;
a comparator configured to compare the selected bits to the legal values, said comparator comprising a logic device configured to compare the legal values against at least one of the selected bits; and
a rejection device configured to reject the incoming transmission if the selected bits do not match the legal values.

37. The device according to claim 36, wherein the incoming transmission comprises a packet.

38. The device according to claim 36, wherein said bit recognition device comprises a state machine configured to identify bits from the incoming transmission.

39. The device according to claim 36, wherein the rejection device comprises a Medium Access Control device.

40. The device according to claim 36, further comprising:
a packet reject line coupled between said comparator and said rejection device,
wherein:
said comparator is further configured to assert the packet reject line if the selected bits do not match the legal values; and
said rejection device is further configured to reject the incoming transmission if the packet reject line is asserted.

41. The device according to claim 40, further comprising a state machine coupled to the incoming transmission and the packet reject line and configured to produce at least a part of a timing of a channel busy signal based on the packet reject line.

42. The device according to claim 40, further comprising:
a transmitter coupled to the channel busy signal;
wherein said transmitter is configured to allow transmissions based on the channel busy signal.

43. The device according to claim 40, wherein:
said receiver is coupled to the packet reject line; and
said receiver is further configured to reset based on assertion of the packet reject line.

44. The device according to claim 36, further comprising a channel busy line and a state machine configured to assert the channel busy signal when the receiver receives a transmission and clear the channel busy line when an incoming transmission is rejected.

45. The device according to claim 36, further comprising:
memory elements configured to store the selected bits,
wherein said comparator is coupled to said register and the memory elements.

46. The device according to claim 45, wherein said comparator is coupled to each memory element and each register location in the register.

47. The device according to claim 36, wherein the selected bits have set values or a range of values that correspond to the legal values.

48. The device according to claim 36, wherein said bit recognition device is configured to recognize at least one of data rate bits, reserved bits, length bits, and service field bits in a packet of the incoming transmission.

49. The device according to claim 36, further comprising:
a demodulator configured to demodulate received transmissions; and
a packet reject line coupled between said comparator and said demodulator,
wherein said comparator is further configured to assert the packet reject line if the selected bits do not match the legal values, and
wherein said demodulator is further configured to reset if the packet reject line is asserted.

50. The device according to claim 36,
wherein the comparator comprises comparison logic coupled to said register.

51. The device according to claim 50, further comprising:
an input device configured to write the legal values in said register.

52. The device according to claim 51, wherein said input device includes software that queries a user for the legal values to be used.

53. The device according to claim 51, wherein said input device includes software that reads the legal values.

54. The device according to claim 36, wherein said incoming transmissions are wireless.

55. The device according to claim 36, wherein said incoming transmissions are OFDM transmissions.

56. The device according to claim 36, wherein said incoming transmissions are wireless communications conforming to a LAN protocol.

57. The device according to claim 36, wherein said incoming transmissions are 802.11a transmissions.

58. The device according to claim 36, wherein said incoming transmissions are 802.11-like transmissions.

59. The device according to claim 36, wherein said incoming transmissions are wire line transmissions.

60. The device according to claim 36, wherein the storage includes a table of the legal values for at least part of the selected bits.

61. A computer readable media having instructions stored thereon that, when loaded into a computer, cause the computer to perform steps comprising:
accessing bit information regarding a plurality of fields of a valid packet, wherein each field includes at least one predetermined bit, and wherein the bit information includes legal values for the predetermined bits as set by a networking standard, wherein said predetermined bits include at least one of a rate bit, a length bit, a reserved bit, and a service bit; and
loading the legal values into a register,
wherein said register is coupled to a packet screening device that validates incoming packets by comparing the incoming packets to the legal values.

62. The computer readable media according to claim 61, wherein said legal values are not determined via parity calculations.

63. The computer readable media according to claim 61, wherein said legal values comprise ranges of valid bit values.

64. The computer readable media according to claim 61, wherein said predetermined bits include a parity bit.

65. The computer readable media according to claim 61, wherein said legal values comprise any value of a standard of a protocol of the incoming packets, a standard of a device transmitting, receiving or storing the incoming packets, and a standard of any implementation of a device transmitting, receiving, or storing the incoming packets.

66. The computer readable media according to claim 61, wherein said register comprises a software register configured to maintain specific bit values and ranges of bit values.

67. A device, comprising:
means for receiving a transmission;
means for accessing bit information regarding a plurality of fields of a valid packet, wherein each field includes at least one predetermined bit, and wherein the bit information includes legal values for the predetermined bits as set by a networking standard, wherein the predetermined bits include at least one of a length bit, a rate bit, a reserved bit, and a service bit;
means for comparing identified bits of the transmission to the legal values to determine if the identified bits are part of a valid packet; and
means for rejecting the identified bits as a false packet if a comparison of the identified bits and the legal values do not match.

68. The device according to claim 67, wherein said legal values include a parity based pattern.

69. The device according to claim 67, wherein the identified bits include at least one of a length bit, a rate bit, and other reserved fixed value bits.

70. The device according to claim 67, wherein said legal values comprise at least one of a set value and a range of values.

71. The device according to claim 67, wherein said transmission is a packet.

72. The device according to claim 67, wherein said transmission is an OFDM transmission.

73. The device according to claim 67, wherein said transmission is a wireless transmission.

74. The device according to claim 67, wherein said transmission is a wireless 802.11a packet transmission.

75. The device according to claim 67, further comprising:
means for testing values used in the plurality of fields of received packets to determine a range of the legal values being transmitted in the tested fields; and
means for adding the tested fields and adding corresponding comparison data to the bit information.

76. The device according to claim 67, further comprising means for choosing a legal value.

77. A method comprising the steps of:
receiving a transmission;
identifying predetermined bits of the transmission;
comparing identified bits to legal values to determine if the identified bits are part of a valid packet; and
rejecting the identified bits as a false packet if comparison of the identified bits and the legal values do not match;
wherein:
said step of identifying comprises identifying at least one predetermined bit of the transmission that is not a parity bit;
said step of comparing does not include parity bit calculations;
said legal values include patterns determined by other than parity calculations;
said step of rejecting comprises, rejecting an incoming packet associated with the identified bits as the false packet, clearing a line busy signal used by one of a receiver and a transmitter; and resetting a receiver device that receives transmissions;

said legal values comprise set bit values and ranges of bit values corresponding to the identified bits;

the identified bits comprise rate bits, length bits, reserved bits, service bits, and parity bits having set bit values and ranges of values;

said set bit values and said ranges of values are based on at least one of a packet protocol standard, a device standard, and an implementation specific standards of a communications system receiving said transmission;

said method further comprises the step of setting the legal values based on a user input, including the steps of, displaying a user interface, retrieving user inputs regarding the set bit values and the ranges of values of the legal values, storing the legal values, and running a program that performs a step of writing the legal values to a register for use by said comparing step;

said transmission is a wireless OFDM 802.11a packet transmission; and said legal values corresponds to selected bits from an 802.11a packet.

78. A device, comprising:

a receiver configured to receive incoming transmissions;

a bit slice recognizer configured to recognize selected bits from an incoming transmission;

a comparator configured to compare the selected bits to legal values; and a rejection device configured to reject the incoming transmission if the selected bits do not match the legal values;

wherein:

the incoming transmission comprises an OFDM encoded 802.11a wireless packet;

said bit slice recognizer comprises a state machine configured to identify the selected bits from the incoming transmission;

said rejection device comprises a Medium Access Control device;

the device further comprises a packet reject line coupled between said comparator and said rejection device;

said comparator is further configured to assert the packet reject line if the selected bits do not match the legal values;

said rejection device is further configured to reject the incoming transmission if the packet reject line is asserted;

said state machine is coupled to the incoming transmission and the packet reject line and configured to produce at least a part of a timing of a channel busy signal based on the incoming transmission and the packet reject line;

the device further comprising a transmitter coupled to the channel busy signal;

said transmitter is configured to allow transmissions based on the channel busy signal;

said receiver is coupled to the packet reject line;

said receiver is further configured to reset based on assertion of the packet reject line;

said state machine is further configured to assert the channel busy signal when the receiver receives the incoming transmission and clear the channel busy line when the incoming transmission is rejected;

said legal values comprise a predetermined value and a range of values for data rate bits, reserved bits, length bits, and service field bits;

the device further comprising memory elements configured to store the selected bits;

said comparator comprises, a register configured to store the legal values, and a logic device configured to compare stored values in the register to stored values in the memory elements;

the comparison device is coupled to each memory element and each register location in the register;

said bit slice recognizer is configured to recognize data rate bits, reserved bits, length bits, service field bits, and other predetermined bits in a packet of the incoming transmission;

the device further comprising a demodulator configured to demodulate the received transmissions;

said demodulator coupled to the packet reject line and further configured to reset if the packet reject line is asserted;

the device further comprising an input mechanism configured to write the legal values in said register;

said input mechanism includes software configured to query a user for the legal values and software to write the legal values to said register; and at least some of the legal values are written to said register in tabular format.

79. The method according to claim 1, further comprising a step of choosing fields of a packet that comprise the identified bits.

80. The method according to claim 79, wherein the step of choosing fields comprises choosing fields based on previously received packets.

81. The device according to claim 67, further comprising means for choosing fields of a packet that comprise the identified bits.

82. The device according to claim 81, wherein said means for choosing fields comprises means for choosing fields based on previously received packets.

* * * * *